United States Patent [19]

Reavell et al.

[11] Patent Number: 4,916,372
[45] Date of Patent: Apr. 10, 1990

[54] CONTROL SYSTEM FOR SCHOOL BUS SAFETY DEVICE

[75] Inventors: James Reavell; Raymond Heath, both of Campbellford, Canada

[73] Assignee: School Bus Parts Co. of Canada, Inc., Ontario, Canada

[21] Appl. No.: 345,188

[22] Filed: May 1, 1989

[51] Int. Cl.$^4$ ................................................. G08B 5/22
[52] U.S. Cl. ...................................... 318/437; 318/162; 318/470; 340/433; 116/28 R
[58] Field of Search ............... 318/162, 437, 466, 467, 318/470, 549; 340/433, 487, 488; 116/28 R, 63 R; 40/466; 180/281, 289; 246/125

[56] References Cited

U.S. PATENT DOCUMENTS

| | | | |
|---|---|---|---|
| 2,920,309 | 1/1960 | Fultz | 340/487 X |
| 4,339,744 | 7/1982 | Latta | 340/433 |
| 4,559,518 | 12/1985 | Latta | 340/433 |
| 4,697,541 | 10/1987 | Wicker | 116/28 R |
| 4,766,413 | 8/1988 | Reavell | 246/125 X |
| 4,816,804 | 3/1989 | Reavell | 246/125 X |

Primary Examiner—Bentsu Ro
Attorney, Agent, or Firm—Michael Ebert

[57] ABSTRACT

Apparatus for activating a safety device hingedly mounted on a shool bus to swing it out to an outstretched position when the bus door is opened and to return the device to its retracted position when the bus door is closed. The system includes a control switch which is caused to close when the door is opened and to open when the door is closed. Associated with the control switch is a control circuit for connecting a DC power supply to a unidirectional DC motor operatively coupled through an eccentric drive and a link arm to the safety device whereby in the course of a single cycle of motor rotation, during one half of the cycle the device is caused to swing out to its fully outstretched position, and during the other half, the device is caused to return to its fully retracted position. The control circuit includes a commutator formed by a conductive rotor mounted on the motor shaft and first and second brushes which engage the rotor at diametrically-opposed positions, the rotor having an insulating element at its zero position to disconnect the brush engaging the element from the rotor.

9 Claims, 3 Drawing Sheets

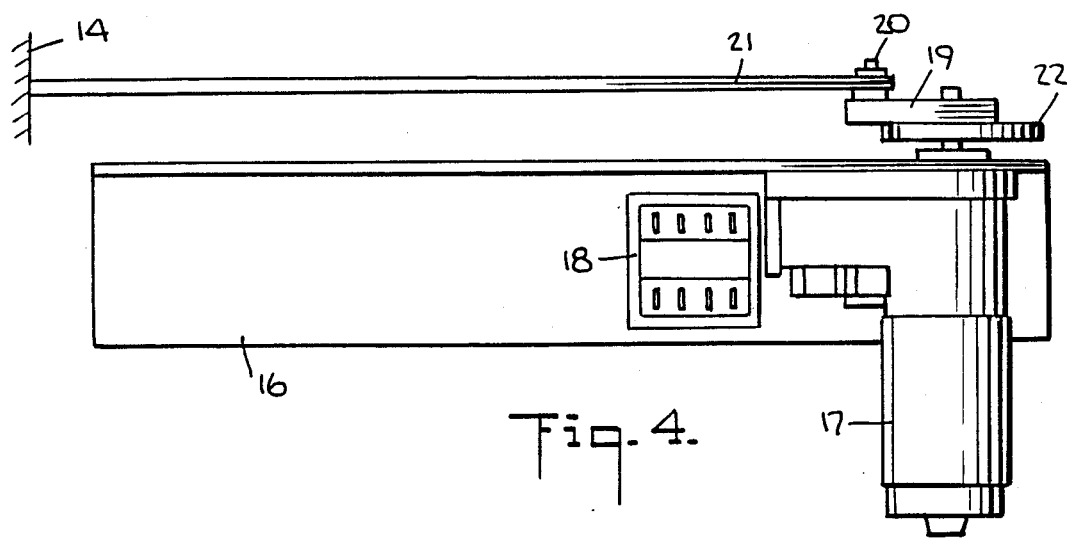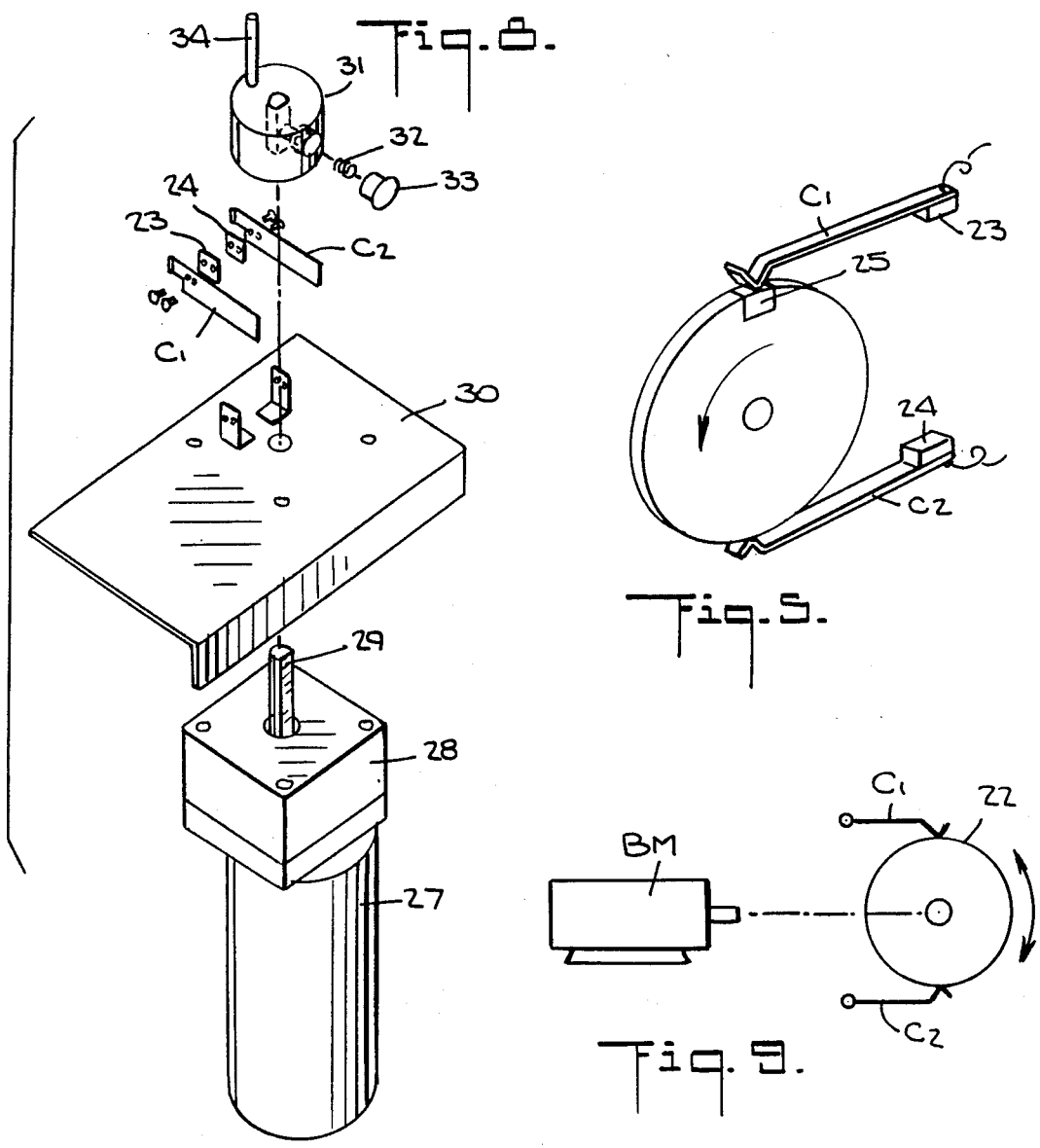

CONTROL SYSTEM FOR SCHOOL BUS SAFETY DEVICE

BACKGROUND OF INVENTION

1. Field of Invention

This invention relates generally to safety devices for school buses, and more particularly to a control system therefor which when the door of the bus is opened to unload or load passengers, this causes a stop sign or a crossing arm to swing out, and when the bus door is closed, the sign or arm is then caused to return to its retracted position.

2. Status of Prior Art

School buses pick up or discharge children attending a school serviced by the bus at various points along a route running through the community in which the school is situated. As a safety measure, school buses have for many years been equipped with a stop sign mechanism under the control of the bus driver, the mechanism acting to swing out the stop sign from its normally retracted position against the side of the bus to an outstretched position to provide a signal alerting drivers of nearby vehicles that children are entering or alighting the bus. U.S. Pat. Nos. 2,384,689 and 3,094,683 are illustrative of manually-operated school bus sign devices, while U.S. Pat. No. 2,252,529 discloses a hydraulically-operated school bus sign.

It is also known to provide motor-operated school bus signs, such apparatus being illustrated in U.S. Pat. Nos. 2,281,717 and 4,138,668. Of greatest prior art interest in this regard is the 1982 U.S. Pat. No. 4,339,744 to Latta, Jr. In this patent, the stop sign mounted on the side of the bus is operated by a unidirectional DC motor and a linkage associated with the sign. This linkage in conjunction with limit switches acts to deploy and retract the stop sign.

Also of prior art interest is the U.S. Pat. No. 4,697,541 to Wicker, wherein a school bus is provided with a crossing arm attached to the front bumpers of the bus for movement between a retracted position alongside the bumper to an extended position projecting outwardly from the bumper to protect children walking in front of the bus.

The concern of the present invention is generally with safety devices for school buses of the stop sign or crossing arm type, and in particular with the control system for actuating these devices.

In the control system disclosed in the Reavell U.S. Pat. No. 4,766,413, a hinged stop sign for a school bus is driven by a unidirectional DC motor through an eccentric drive and a link arm having associated therewith two normally closed limit switches. In the course of a motor operating cycle, the stop sign swings out to its fully outstretched position, at which point one limit switch is caused to open, and then returns to its retracted position, at which point the other limit switch opens. The limit switches are included in a control circuit which supplies power to the motor.

The control circuit is responsive to a door switch associated with the bus door so that when the door is opened, the door switch is then closed, and power is supplied to the motor through one closed limit switch until the sign reaches its outstretched position, at which point this limit switch opens to cut off the motor. When the door is closed and the door switch is then open, power is supplied to the motor through the other closed limit switch until the sign reaches its retracted position, at which point this limit switch opens to cut off the motor. Thus the operation of the sign is coordinated with that of the bus door to provide a stop signal when the need therefor arises. Similar limit or microswitch arrangements are included in the control circuits disclosed in the above-identified Latta, Jr., patent.

The use of limit switches in a control system for a school bus safety device has certain practical drawbacks. Such switches are highly sensitive and therefore may respond falsely to vibratory forces. Thus where as in the prior Reavell U.S. Pat. No. 4,766,413, the microswitches are associated with a link arm coupled to a stop sign, should the sign vibrate, these vibrations will be transferred to the link arm and cause improper actuation of the switches.

Also, in typical safety device control circuits using limit switches, the switches are interposed between the motor and the positive or high side of the power supply. Should either of the limit switches become grounded as a result of a circuit defect, or because of water seepage into the control box mounted on the exterior of the bus, the resultant heavy current flow may overheat the circuit and give rise to a fire. This condition is scarcely conducive to the safety of the children carried by the school bus.

SUMMARY OF INVENTION

In view of the foregoing, the main object of this invention is to provide in an apparatus for actuating a safety device to swing it out to an outstretched position or to return it to a retracted position, a control system therefor which has no limit switches and instead makes use of a commutator mounted on the shaft of the drive motor for the device.

A significant advantage of the invention is that the operation of the commutator is physically independent of the safety device and is not subject to vibratory forces.

More particularly, an object of this invention is to provide an arrangement of the above type in which the commutator is connected between the drive motor and ground, and the only possible consequence of a short would be to connect the motor to ground, thereby obviating the danger of fire or damage to the system as a result of a short.

Still another object of the invention is to provide a control system that operates efficiently and reliably and which can be constructed at relatively low cost.

Briefly stated, these objects are attained in apparatus for activating a safety device hingedly mounted on a school bus to swing it out to an outstretched position when the bus door is opened and to return the device to its retracted position when the bus door is closed. The system includes a control switch which is caused to close when the door is opened and to open when the door is closed. Associated with the control switch is a control circuit for connecting a DC power supply to a unidirectional DC motor operatively coupled through an eccentric drive and a link arm to the safety device whereby in the course of a single cycle of motor rotation, during one half of the cycle the device is caused to swing out to its fully outstretched position, and during the other half, the device is caused to return to its fully retracted position.

The control circuit includes a commutator formed by a conductive rotor mounted on the motor shaft and first and second brushes which engage the rotor at diametrically opposed positions, the rotor having an insulating element at its zero position to disconnect the brush engaging the element from the rotor. The motor is connected to the power supply through the control switch and the commutator, such that when the door is opened and the control switch is then closed, the motor is energized through the first brush to swing the device to its fully outstretched position, at which point the first brush is disconnected by the element to shut off the motor. When the door is closed and the control switch is then open, the motor is then energized through the second brush to return the device to its retracted position, at which point the second brush is disconnected by the element to shut off the motor.

BRIEF DESCRIPTION OF DRAWINGS

For a better understanding of the invention as well as other objects and further features thereof, reference is made to the following detailed description to be read in conjunction with the accompanying drawings, wherein:

FIG. 4 is a top view of the case of the apparatus opened to show the bracket on which the motor and the relay of the apparatus is mounted;

FIG. 5 is a perspective view of the commutator;

FIG. 8 is an exploded view of a preferred embodiment of a commutator and drive motor assembly; and FIG. 9 schematically illustrates a bi-directional commutator.

DESCRIPTION OF INVENTION

Control Apparatus For Safety Device

Figure 1:
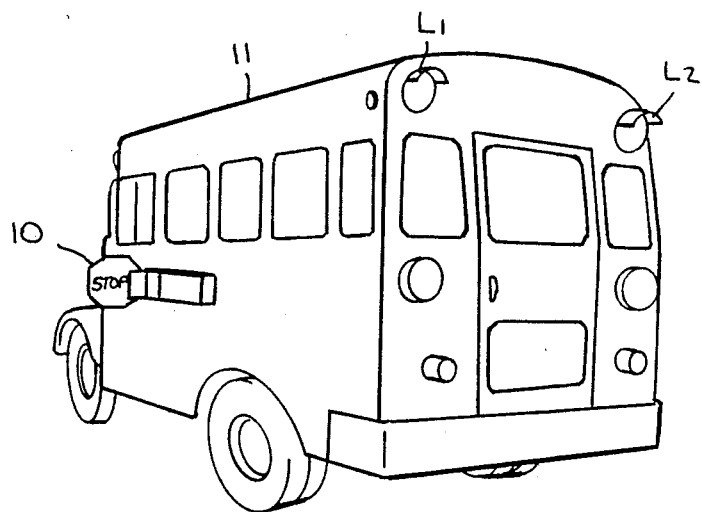
FIG. 1 shows a school bus having mounted on one side thereof a stop sign control apparatus in accordance with the invention.
Figure 2:
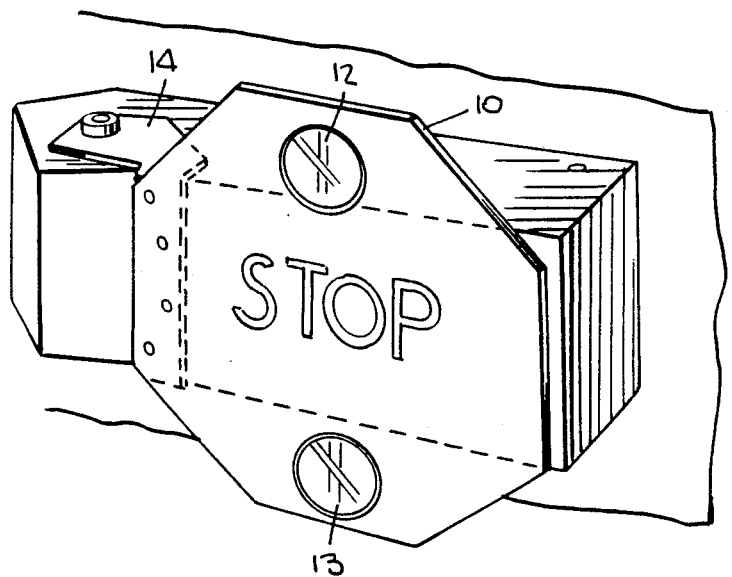
FIG. 2 is a front view of a stop sign control apparatus in which the stop sign is in its retracted position.
Figure 3:
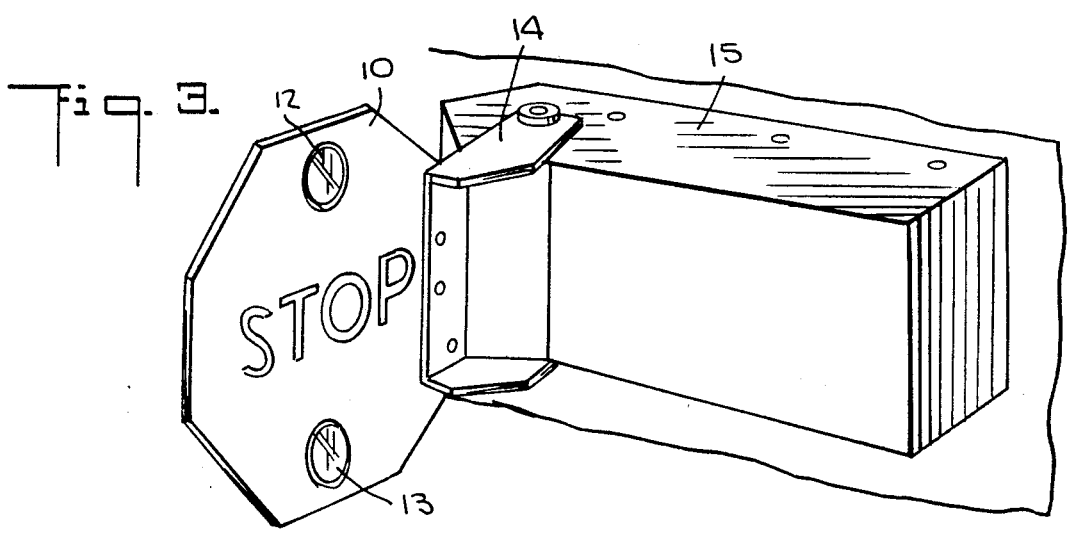
FIG. 3 shows the stop sign in its outstretched position.

Referring now to FIGS. 1 to 3, there is shown a bus stop sign control apparatus in accordance with the invention for swinging a stop sign 10 from its retracted position against the side of a school bus 11 to an outstretched position where it is visible to those behind and in front of the bus. Stop sign 10 in the embodiment shown is in the form of an octagonal plate provided with flasher lights 12 and 13 above and below the STOP indication. The sign plate is bolted to the hinge plate 14 of a hinge mechanism. The apparatus 11 is supported on a box-like casing 15 which is mounted on the side of the bus.

In operation, when the door of the bus is opened to load or unload passengers, then stop sign 10 is caused by the apparatus to swing out until it reaches the fully outstretched position, as shown in FIG. 3, in which position it serves to alert nearby vehicles. At the same time, lights 12 and 13 on the sign are caused to flash periodically to provide a flashing light signal to warn the drivers of nearby vehicles. These flashing lights appear on both sides of the sign. In addition, rear lights $L_1$ and $L_2$ on the vehicle may be caused to flash.

As shown in FIG. 4, mounted within casing 15 adjacent the rear end thereof is a bracket 16 on which is supported a DC unidirectional gear motor 17 and a relay 18. Keyed to the shaft of motor 17 is an eccentric drive arm 19 provided with an off-center pivot pin 20 coupled to one end of a link arm 21. Thus when motor 17 is energized, the resultant rotation of eccentric arm 19 causes link arm 21 to undergo a forward stroke to the left and then a return stroke to the right in the course of each full cycle of rotation.

Link arm 21 is so coupled to hinge plate 14 of stop sign 10 that in the course of the forward stroke, stop sign 10 is caused to swing out until it occupies a fully outstretched position, as shown in FIG. 3. And in the course of the return stroke of the link arm, the stop sign returns to its fully retracted position, as shown in FIG. 2. The forward stroke is completed in the first half cycle of motor rotation and the return stroke in the next half cycle.

Mounted on the metal shaft of motor 17 and attached to drive arm 19 is the rotor 22 of a commutator. As shown separately in FIG. 5, rotor 22 is engaged at diametrically-opposed positions on its rim by first and second contact brushes $C_1$ and $C_2$. In practice, the entire rotor may be made of a conductive metal such as a copper alloy. The rotor is therefore grounded through the metal shaft of the motor which is mounted within the metal casing.

Contact brushes $C_1$ and $C_2$ are formed of flat spring metal of high conductivity, such as bronze. The free end of each flat spring is in a V-formation, the apex of which engages the rim of rotor 22. Brushes $C_1$ and $C_2$ are cantilevered from stationary pads 23 and 24 and are spring biased against the rotor rim to maintain good contact therewith at all times.

Alternatively, instead of having the brushes engage the rim of the rotor, they may be arranged to engage a conductive ring on one side of the rotor.

Inserted in the rim of rotor 22 at its zero position is an insulation element 25 so that the brushes which engage the rim of the rotor are electrically connected to the rotor except when in the course of rotor rotation, either one of the brushes engages element 25, at which point the connection is broken. This disconnection occurs twice in the course of each single cycle of motor rotation, first at the completion of the forward stoke (the first half cycle), and second at the completion of the return stroke (the remaining half cycle).

Control System

Figure 6:
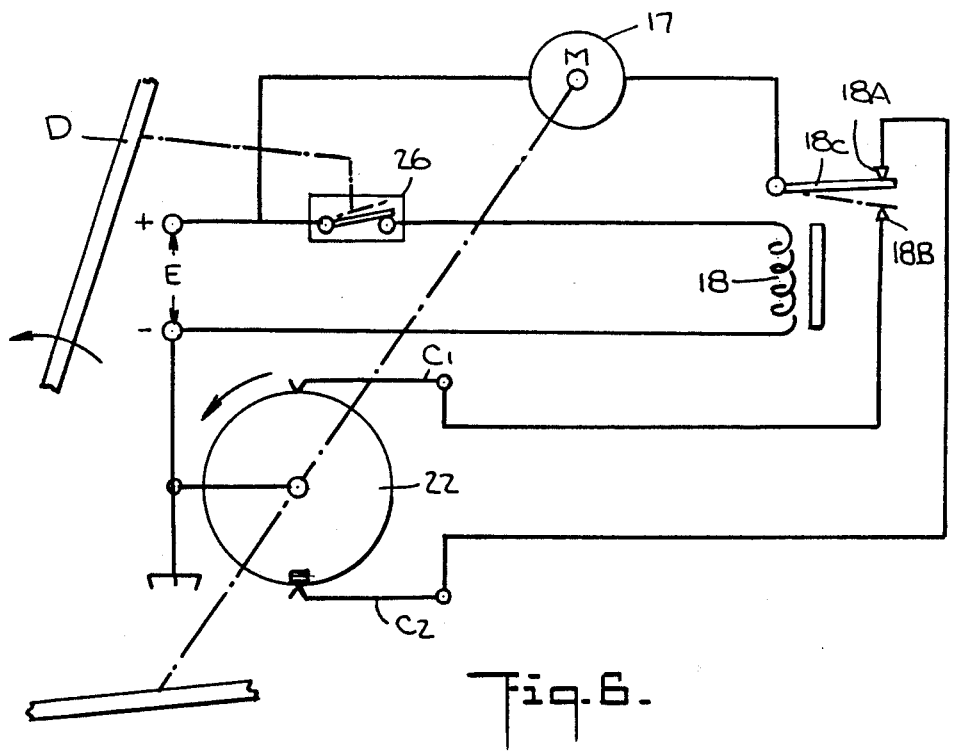
FIG. 6 is a schematic circuit diagram of the control system for the apparatus.

Referring now to FIG. 6, there is shown the control system for motor 17 which when energized by a DC power source E (the vehicle battery) causes rotor 22 of the commutator to rotate and at the same time causes link arm 21 to reciprocate, thereby causing the hinged bus stop sign 10 to swing out to its fully outstretched position in the course of the first half cycle, and to then return to its fully retracted position in the course of the remaining half cycle.

The electromagnetic coil of relay 18 is connected in series with a control switch 26 to power source E. Control switch 26 is operatively associated with door D of the bus so that when the door is opened, the switch is then closed (as shown), but when the door is closed, the switch is open.

Relay 18 is of the single-pole, double-throw type and its movable armature contact 18C is connected through motor 17 to the positive terminal of power source E. Movable contact 18C of the relay normally engages a fixed contact 18A on one side thereof, which fixed contact is connected to contact brush $C_2$ that engages rotor 22 of the commutator and therefore acts to connect relay contact 18A to the common or negative terminal of power source E, except when this brush engages insulation element 25 on the motor rim to break the circuit.

When relay 18 is energized—and this only happens when door switch 26 is closed—movable relay contact 18A is then caused to engage a fixed contact 18B on the other side of contact 18A which is connected to contact brush $C_1$ of the commutator. Contact brush $C_1$, since it engages conductive rotor 22, acts to connect relay contact 18B to the common or negative terminal of power source E, except when the brush engages insulation element 25 on the rotor rim to break the circuit.

When, therefore, the driver of the bus opens door D, causing door switch 26 to close to energize relay 18, motor 17 is then connected to power supply E through relay contact 18B and commutator brush $C_1$, and the motor turns a half cycle to cause link arm 21 to swing out stop sign 10 to its fully outstretched position, at which point the insulation element 25 of the commutator rotor is in line with brush $C_1$, thereby disconnecting the motor from the power source, so that no further movement of the stop sign occurs.

The stop sign remains in its fully outstretched position and the motor remains inactive until such time as the bus operator closes the door, thereby opening door switch 26 to de-energize relay 18. As a consequence, motor 17 resumes operation, for it is now powered through relay contact 18A and commutator brush $C_2$. Motor 17 then turns another half cycle to cause link arm 21 to fully retract the stop sign, at which point the insulation element 25 of the commutator rotor is now in line with brush $C_2$, thereby disconnecting the motor from the power source so that no further movement of the stop sign occurs.

Thus the driver of the bus need take no separate action to swing out or retract the stop sign, for the operation of the stop sign is automatically coordinated with the opening and closing of the bus door. The motor control circuit is linked to a flasher unit for the bus lights and for lights on the stop sign in the manner disclosed in the Latta Jr. et al. patent, or by any other suitable circuit means, so that whenever the stop sign is fully outstretched, the flasher unit is then actuated.

The control apparatus in accordance with the invention can be used for traffic control purposes other than that provided by a stop sign. Thus a guard rail or crossing arm may be mounted on the hinge mechanism, and by means of a selective control switch, caused either to swing out to an outstretched position to arrest the flow of traffic or to a retracted position to permit such flow.

Because the commutator is at common potential, should water seep into the control box and short the brushes or should a defect arise producing the same result, the only consequence of this will be that current will flow through the motor. Hence a short circuit will not give rise to overheating of the circuit wires and a possible fire.

Simplified Control System

Figure 7:
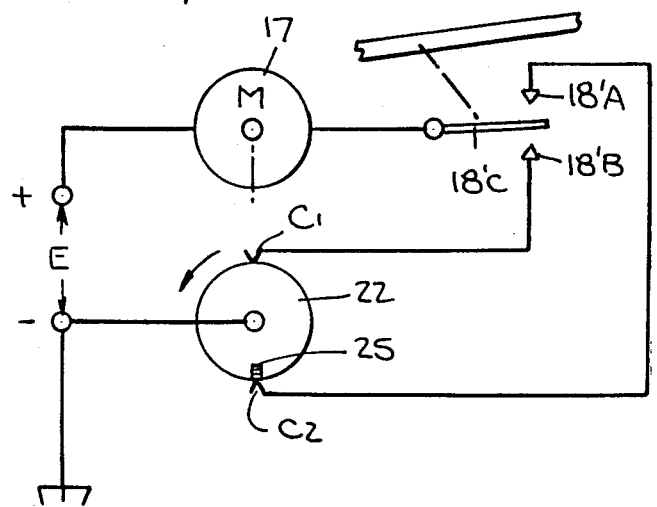
FIG. 7 is the schematic diagram of a simplified control system in accordance with the invention.

It is possible to simplify the control circuit in the manner shown schematically in FIG. 7 where relay 18 of FIG. 6 is dispensed with and also door switch 26. Instead, door D is operatively coupled to a single-pole, double-throw control switch having a movable contact 18'C, which when the door is closed engages fixed contact 18'A, and when the door is opened engages fixed contact 18'B. Fixed contact 18'A is connected to contact brush $C_1$ of the commutator, while fixed contact 18'B is connected to contact brush $C_2$, the commutator being the same as in FIG. 6.

The operation is essentially the same as in FIG. 6; for when the bus door is opened, the motor is energized through contact 18'B and brush contact $C_1$ to cause the stop sign to swing out to its fully outstretched position, at which point brush $C_1$ engages insulation element 25 to cut off the motor. And when the door is closed, the motor is energized through contact 18'A and brush $C_2$ to cause the sign to fully retract, at which point brush $C_2$ engages insulation element 25 and the motor is cut off.

Commutator and Drive Motor Assembly

In the arrangement shown in FIG. 4, drive motor 17 has mounted on its shaft both an eccentric drive arm 19 provided with an off-center pin 20, and the rotor 22 of the commutator. In this way, arm 19 and rotor 22 are turned at the same time.

FIG. 8 illustrates a preferred embodiment of a commutator and drive motor assembly in which the rotor of the commutator also functions as the drive arm for the link arm 21 of the apparatus, thereby providing a more compact and efficient arrangement.

In the assembly shown in FIG. 8, the drive motor 27 for the stop sign apparatus is provided with a reduction gear box 28 having an output shaft 29. Motor 27 is supported on a mounting bracket 30 having a hole therein through which shaft 29 projects.

Mounted on shaft 29 is an electrically-conductive commutator rotor 31 that is held to the shaft by means of a set screw 32. Shaft 29 is received in a central bore in rotor 31, and set screw 32 screws into a lateral threaded bore in the rotor which communicates with the central bore, so that the screw can engage the shaft.

Press fit into the lateral bore behind set screw 31 is a plug 33 formed of elastomeric, synthetic, plastic insulating material having a disc-shaped head. When the plug is inserted in the bore, its head rests on the surface of the rotor.

Received in an eccentric bore in rotor 31 is a linkage pin 34 to which link arm 21 is coupled. Hence in the course of a full cycle of rotation of rotor 31, link arm 21 is caused by pin 34 during the first half cycle to make its forward stroke, and in the second half cycle to make its return stroke in the manner described in connection with FIG. 4.

Engaging the conductive surface of rotor 31 at diametrically-opposed positions are contact brushes $C_1$ and $C_2$. The ends of these brushes are attached to insulation pads 23 and 24 (as in FIG. 5). These pads are supported on angles 23B and 24B mounted on bracket 30.

The operation is the same as that described in connection with FIGS. 4 and 5, such that when the commutator rotor completes a first half cycle of rotation, brush $C_1$ then engages the head of insulation plug 33, thereby disconnecting this brush electrically from the rotor. And at the completion of the second half cycle, brush $C_2$ then engages the head of plug 33 to disconnect this brush from the rotor.

Bi-Directional System

In the apparatus disclosed in FIGS. 1 to 8, the drive motor operates unidirectionally so that in the course of a full cycle of rotation in the counterclockwise direction, the link arm for swinging the stop sign is caused to make a forward stroke in the first half cycle to swing out the sign to its fully outstretched position, and is then caused in the second half cycle to make a return stroke to swing in the sign to its fully retracted position.

The same action may be carried out by means of a bi-directional DC drive motor such that when power is applied to the motor in one polarity to cause the motor to turn a half cycle in, say, the counterclockwise direction, the bus sign is caused to swing out; and when the power is then applied to the motor in the reverse polarity, the motor is caused to turn a half cycle in the clockwise direction, and the bus sign is then caused to swing in.

Thus if commutator rotor 22, as shown n FIG. 9, is caused by a bi-directional motor BM to turn clockwise a half cycle in the counterclockwise direction, at the completion of which insulating element 25 is at its zero position, then brush $C_1$ which engages element 25 is disconnected from the rotor. And when motor BM is energized in the reverse polarity to then turn clockwise a half cycle, at the completion of this turn, element 25 is at its 180 degree position and is engaged by brush $C_2$ which is then disconnected from rotor 22.

In the bi-directional arrangement, the swinging arrangement must be such that when the bus door is opened, power is applied to the motor through the commutator in one polarity, and when the bus door is closed, the applied power is in the reverse polarity.

Hence if the arrangement for this purpose is similar to that in FIG. 7 which dispenses with a relay, instead of a simple on-off switch as shown in FIG. 7, one must use a double-pole double-throw switch so arranged that when the door is opened, power is applied to the motor through the commutator by way of one section of the DPDT switch, and when the door is opened the power is applied in the reverse polarity by way of the other section of the switch.

If a relay is used as in FIG. 7, then the door switch for bi-directional operation must be a single pole, double-throw (SPDT) switch so arranged that when the door is open it applies voltage from the battery to the relay and motor circuit in one polarity, this polarity being reversed when the door is closed.

As pointed out previously, the invention is not limited to bus sign control. Thus instead of a stop sign attached to the link arm-operated hinge, a long crosswalk tube may be attached to this hinge. The casing of the apparatus, in this instance, will be attached to the front bumper of the school bus, so that when the bus door is opened, the crosswalk tube swings out, and when the door is closed it swings in.

While there have been shown and described preferred embodiments of a control system for school bus safety device in accordance with the invention, it will be appreciated that many changes and modifications may be made therein without, however, departing from the essential spirit thereof.

It is to be understood that while the brushes which engage the rim of the conductive commutator rotor become electrically disconnected from the rotor when they touch the insulating element on the rim, the brushes always remain in physical engagement with the rim and therefore do not shift their position relative to the rotor as in a switch where one contact moves toward or away from another contact. It is also to be understood that the positive terminal of the power source represents the high side of the control system, whereas the negative terminal is the common side.

While the stop sign 10 is shown as having lights thereon, in practice such lights may be omitted, depending on particular state requirements for school bus signs. And while the brushes $C_1$ and $C_2$ in FIG. 5 have a V-formation at their ends, in practice this formation may be omitted. Thus the brushes may be formed of straight strips of beryllium having a flat or round cross section. And while the insulation plug has been described as being of elastomeric material and as being press fit into the threaded bore in the rotor behind the set screw, in practice it may take the form of a nylon machine screw that screws into this bore.

We claim:

1. Apparatus for activating a safety device hingedly mounted on a school bus to cause the device to swing out to a fully outstretched position when the bus door is opened and to return the device to its fully retracted position when the bus door is closed, said apparatus comprising:
   (a) a unidirectional DC motor energizable by a DC power source and operatively coupled to the safety device through an eccentric drive and a reciprocating link arm, whereby in the course of a single cycle of motor rotation, during the first half cycle the arm undergoes a forward stroke to swing out the device to its fully outstretched position, and during the second half cycle, the arm undergoes a return stroke to return the device to its fully retracted position;
   (b) a commutator having a conductive rotor operatively coupled to the motor and rotated thereby, and first and second brushes engaging the rotor at diametrically opposed position, said rotor having at its zero position an insulating element to disconnect the brush engaging this element from the rotor;
   (c) a single-pole, double-throw switch having a movable element and first and second fixed contacts which are selectively engaged by the movable contact, said first and second fixed contacts being connected to said first and second brushes respectively, said motor being connected between the positive terminal of the power source and the movable contact, the negative terminal of the source being grounded and being connected to said rotor; and
   (d) means operatively coupling said movable contact to said door, whereby when the door is opened it engages the first fixed contact and thereby supplies power to the motor through the first brush to cause the motor to turn until the safety device reaches its fully outstretched position, at which point said first brush engages the insulating element to cut off the motor, and when the door is thereafter closed, the movable contact then engages the second fixed contact and thereby supplies power to the motor through the second brush to cause the motor to turn until the safety device reaches its fully retracted position, at which point the second brush engages the insulating element to cut off the motor.

2. Apparatus as set forth in claim 1, wherein said safety device is a stop sign hingedly mounted on a side of the school bus.

3. Apparatus as set forth in claim 1, wherein said safety device is a crossing arm mounted on a front bumper of the school bus.

4. Apparatus as set forth in claim 1, wherein said safety device is provided with lights which are energized from said power source only when the device is in its fully outstretched position.

5. Apparatus as set forth in claim 1, wherein said movable contact is actuated by a relay whose coil is connected to said power source only when the door is opened.

6. Apparatus as set forth in claim 5, further including a control switch in series with said relay coil and operatively coupled to said door whereby said control switch is closed only when the door is opened.

7. Apparatus as set forth in claim 1, wherein said brushes are formed of flat metal springs.

8. Apparatus as set forth in claim 1, wherein said rotor is provided at an eccentric position with a pin which is coupled to said link arm.

9. Apparatus as set forth in claim 8, wherein said rotor is mounted on an output shaft of the motor and is provided with a lateral bore to receive a set screw for securing the rotor to the shaft, said insulating element being constituted by a plug inserted in the bore behind the set screw.

* * * * *